Patented May 6, 1952

2,595,899

UNITED STATES PATENT OFFICE 2,595,899

PREPARATION OF MONOCHLOROACETIC ACID

Joseph A. Sonia, Niagara Falls, and Carson E. Lisman, Lewiston, N. Y., assignors to Hooker Electrochemical Company, Niagara Falls, N. Y., a corporation of New York No Drawing. Application October 13, 1949, Serial No. 121,235

5 Claims. (Cl. 260—539)

This invention relates to the manufacture of monochloroacetic acid and is more particularly concerned with a novel complex and its method of preparation, suitable for use in such manufacture.

The chlorination of acetic acid is conventionally performed at a temperature just under the boiling point of the acid, at about atmospheric pressure, and in the presence of a catalyst or promoter such as boron trifluoride, phosphorus, acetic anhydride, sulfur, et cetera. However, using prior art procedures, there is obtained a substantial percentage of undesirable dichloroacetic acid which must be separated by a crystallisation procedure, if the necessary degree of purity for industrial utilisation is to be obtained. In commercial practice it is undesirable to perform this crystallisation step, since the step requires extra processing and thereby adds to the cost of the finished product.

It is, therefore, a principal object of the present invention to provide a method for the production of a complex enabling the manufacture of monochloroacetic acid which yields an acid of such purity that a final crystallisation step is obviated. Other objects will become apparent hereinafter.

In 1912, B. T. Brooks, 34 JACS 492 (1912), called attention to the lack of information on the mechanism of the reaction of acetic acid with phosphorus trichloride and also pointed out the differences reported by various researchers in the identity of the reaction products. One course proposed for the reaction is:

$$CH_3COOH + 2PCl_3 \rightarrow 3CH_3COCl + P_2O_3 + 3HCl \quad (1)$$

while another proposal is in accordance with the following equation:

$$3CH_3COOH + PCl_3 \rightarrow 3CH_3COCl + P(OH)_3 \quad (2)$$

Brooks reports considerable researchers, including a low temperature reaction of acetic acid and phosphorus trichloride, from the product of which is distilled an almost theoretical quantity of acetyl chloride at a temperature of about 50 degrees to 55 degrees centigrade leaving a residual phosphorus acid, and concludes that the major reaction is:

$$3CH_3COOH + PCl_3 \rightarrow 3CH_3COCl + H_3PO_3 \quad (3)$$

with two secondary reactions occurring as follows:

$$CH_3COOH + CH_3COCl \rightleftharpoons (CH_3CO)_2O + HCl \quad (4)$$

and $$P(OH)_3 + CH_3COCl \longrightarrow P\begin{matrix}(OH)_2\\\\OOCCH_3\end{matrix} + HCl \quad (5)$$

Since this time a great number of other workers have confirmed Brook's conclusions.

However, in 1926, Albert Van Druten in a University of Leiden, Holland, doctoral thesis entitled "De Inwerking Von Fosfortrichloride op Aziegnzur Anhydride" reported that, in the reaction of phosphorus trichloride and acetic anhydride at low temperatures, intermediates containing eight percent to twenty-three percent of combined chlorine were produced. Van Druten did not mention the separation of pure compounds as such, but he did report the various influences these intermediates had on the preparation of acetyl chloride. He also stated that, at a temperature between 45 degrees and 60 degrees centigrade, these compounds decomposed, liberating hydrogen chloride, and that, once the chlorine as hydrogen chloride was liberated, it is not regenerated by further reaction with chlorine or hydrogen chloride.

We have now found that, if phosphorus trichloride or pentachloride is mixed with acetic acid at a temperature below about 50 degrees centrigrade and the acetic acid then treated with chlorine at this low temperature, a complex is formed which is useful in the conventional chlorination of acetic acid to yield the monochloro derivative while minimising the quantity of dichloroacetic acid obtained.

The conventional chlorination may then be conducted at a temperature above about 85 degrees and below about 130 degrees centigrade, and under a pressure in excess of the vapor pressure of the reaction mixture at the temperature employed, between about 10 and 100 pounds per square inch gauge being suitable. The mol ratio of chlorine to acetic acid is preferably about 1 to 2. The combination of these conditions enhances the production of monochloroacetic acid to such an extent that a product containing less than two percent dichloroacetic acid is obtained, provided, our novel complex has been previously formed and is maintained in the acetic acid reactant.

The chlorination complex is readily prepared by treating, preferably at about 25 degrees centigrade, acetic acid containing at least 5 to about 12 percent of a phosphorus chloride with chlorine. The reaction product, which may be formed in situ, provides a reactant directly useful in carrying out the chlorination reaction. Elemental phosphorus or a phosphorus compound convertible to a phosphorus chloride upon the introduction of chlorine at temperatures below 50 degrees centigrade may be mixed with the acetic acid to prepare the complex and such materials are the full equivalent of starting with a phosphorus chloride. Hydrogen chloride is the equivalent of chlorine in preparing the complex and can be used in lieu thereof for treating the acetic acid reactant. The prefered produce comprises saturating the acetic acid, containing phosphorus trichloride, with chlorine.

It is important that a superatmospheric pressure in excess of 10 pounds per square inch gauge be maintained upon the reaction mixture in the preparation of the acetic acid reactant. We have found that the presence of hydrogen chloride in the reaction mixture also tends to enhance the production of monochloroacetic acid and retard the production of dichloroacetic acid. Release of pressure at reacting temperature or during heating above 50 degrees centigrade results in decomposition of the complex.

The following tables of data are presented to illustrate our invention further and to show clearly the effect of our complex on the yield of undesired dichloroacetic acid obtained in the chlorination of acetic acid as compared to the effects of catalysts of the prior art on said yield.

The data were accumulated by the following procedure:

Glacial acetic acid was charged to an enamel-lined pressure chlorination vessel equipped with a cooling and/or a heating jacket. The phosphorus chloride was added to the acetic acid at about room temperature. In some cases the charge was heated to a temperature where substantial chlorination initiates, i. e., about ninety degrees centigrade, before chlorine was introduced into the vessel. In other cases, the charge was pre-saturated with chlorine or hydrogen chloride at about fifteen to forty degrees centigrade and the introduction of the chlorine continued while the temperature of the charge was slowly raised to the temperature where substantial chlorination is initiated. As the chlorination reaction progressed, the temperature in the reaction zone was maintained between 90 and 130 degrees centigrade, which is below the boiling point of the reaction mixture under the pressure employed. A superatmospheric pressure, above about ten pounds and preferably between about twenty to forty pounds per square inch, was maintained during the course of all the reactions for which data are given below. The reaction product was fractionated and the yield in percentage of monochloro- and dichloroacetic acids determined.

Table I

| Run Number | $CH_3COOH$ in pounds | $PCl_3$ in grams | Specific Gravity of Reaction Product at 60° C. | Reaction Zone Temperature at initial introduction of chlorine in degrees C. | Per Cent MCA | Per Cent DCA |
|---|---|---|---|---|---|---|
| 1 | 37 | 130 | 1.190 | 90 | 95.2 | 4.45 |
| 2 | 37 | 510 | 1.210 | 90 | 96 | 3.6 |
| 3 | 37 | 1,020 | 1.204 | 37 | 98.7 | 1.3 |
| 4 | 37 | 1,020 | 1.205 | 15 | 98.9 | 1.4 |
| 5 | 37 | 2,040 | 1.216 | 22 | 98.5 | 1.3 |

Runs 1 and 2 illustrate the effect of phosphorus trichloride per se as a catalyst upon the percentage of dichloroacetic acid in the product; the reaction mixture not being pre-saturated with chlorine or hydrogen chloride at a low temperature; with the chlorination being carried to about fifty percent conversion to the monochloro- state, as indicated by the specific gravity of the reaction product. Runs 3 and 4 illustrate the effect upon said percentage of pre-saturation at low temperature with chlorine and hydrogen chloride, using about six percent phosphorus chloride in the formation of the complex. Run 5 illustrates the effect upon said ratio of pre-saturation with chlorine and hydrogen chloride, using about 12 percent phosphorus trichloride in the formation of the complex.

Table II

| Run Number | $CH_3COOH$ in pounds | $PCl_3$ in pounds | Specific Gravity of Reaction Product at 60° C. | Reaction Zone Temperature at initial introduction of Chlorine in degrees C. | Per Cent MCA | Per Cent DCA |
|---|---|---|---|---|---|---|
| 6 | 6,267 | 190 | 1.385 | 90 | 82.9 | 15.1 |
| 7 | 6,100 | 190 | 1.382 | 90 | 83.5 | 15.5 |
| 8 | 6,406 | 190 | 1.387 | 25 | 95.2 | 3.4 |
| 9 | 6,416 | 190 | 1.383 | 25 | 93.6 | 5.7 |

In the table above, Runs 6 and 7 which are commercial scale runs, illustrate that a product having about a 15.3 percent DCA yield is produced when the reaction mass, containing about three percent phosphorus trichloride, is saturated with chlorine and hydrogen chloride at an initial temperature of ninety degrees centigrade, and the chlorination is carried to about one hundred percent conversion to chlorinated compounds; thus establishing that our novel complex cannot be prepared in accordance with this procedure. Runs 8 and 9 illustrate the effect upon the said yield of DCA of about three percent phosphorus trichloride in the formation of the complex on a large scale chlorination, when the reaction mixture was presaturated with chlorine and hydrogen chloride at about 25 degrees centigrade and the chlorination carried to about one hundred percent conversion. The yield of undesired dichloroacetic acid was reduced by about seventy-five percent and the yield of monochloroacetic acid improved correspondingly.

Table III

| Run Number | $CH_3COOH$ in pounds | $(CH_3CO)_2O$ in grams | $PCl_3$ in grams | Specific Gravity of Reaction Product at 60° C. | Reaction Zone Temperature at initial introduction of chlorine in degrees C. | Analysis of Product | |
|---|---|---|---|---|---|---|---|
| | | | | | | Percent MCA | Percent DCA |
| 10 | 37 | 372 | 0 | 1.118 | 16 | 70.0 | 29.0 |
| 11 | 37 | 372 | 510 | 1.199 | 93 | 96.4 | 3.5 |

Run 10 shows the effect of acetic anhydride as a catalyst upon the DCA percentage yield, the reaction mixture being pre-saturated with chlorine and hydrogen chloride at 16 degrees centigrade with the chlorination reaction continued to about fifty percent conversion to the monochloro- stage. Run 11 shows the effect upon the said yield of about three percent phosphorus trichloride with acetic anhydride as the catalyst, the reaction mixture not pre-saturated with chlorine and hydrogen chloride, the chlorination being started at about 90 degrees centigrade and carried to about fifty percent conversion to the monochloro- compound.

Table IV

| Run Number | $CH_3COOH$ in pounds | Catalyst in grams | Specific Gravity of Reaction Product at 60° C. | Reaction Zone Temperature at initial introduction of chlorine in degrees C. | Analysis of Product | |
|---|---|---|---|---|---|---|
| | | | | | Percent MCA | Percent DCA |
| 12 | 37 | 57.5 Red P, 510 $CH_3COCl$. | 1.183 | 90 | 95 | 3.87 |
| 13 | 37 | 57.5 Red P, 510 $CH_3COCl$. | 1.194 | 90 | 88.6 | 10.3 |
| 14 | 37 | 57.5 Red P | 1.182 | 90 | 91.4 | 7.55 |
| 15 | 37 | 57.5 Red P | 1.206 | 90 | 94.8 | 4.07 |
| 16 | 37 | 520 $P_2O_5$ | 1.205 | 90 | 92.8 | 6.45 |
| 17 | 37 | 542 $P_2O_5$ | 1.228 | 90 | 93.4 | 5.2 |
| 18 | 37 | 419 $H_3PO_4$ 85% | 1.078 | 90 | 83.1 | 16.9 |
| 19 | 37 | 261 $H_3PO_4$ 85%, 103 $P_2O_5$ | 1.139 | 90 | 71.1 | 28.8 |
| 20 | 37 | 600 $H_3PO_3$ + $H_3PO_4$ | 1.210 | 90 | 86.0 | 13.08 |
| 21 | 37 | 600 $H_3PO_3$ + $H_3PO_4$ | 1.222 | 90 | 95.9 | 4.3 |
| 22 | 37 | 317 $H_3PO_3$ + $H_3PO_4$ | 1.159 | 90 | 68.3 | 30.0 |
| 23 | 37 | 772 $PCl_5$ | 1.201 | 15 | 99 | 1.3 |

Runs 12-22, inclusive, illustrate the effect of various catalysts upon the DCA yield, the chlorination being carried to about a fifty percent conversion to the monochloro- compound and the reaction mixture not pre-saturated at low temperature with chlorine and hydrogen chloride.

Run 23 illustrates that $PCl_5$ also forms the complex of this invention when used at low temperatures and pre-saturated with chlorine and hydrogen chloride.

When the pressure under which the chlorination is conducted was lowered from about 30 pounds per square inch gauge to about atmospheric, the yield of undesired dichloroacetic acid was increased by about twenty percent.

This application is a continuation-in-part of our prior-filed application, Serial 17,103, filed March 25, 1948.

Various modifications may be made in the method of the present invention without departing from the spirit or scope thereof, and it is to be understood that we limit ourselves only as defined in the appended claims.

We claim:

1. In a method of preparing an acetic acid reactant for use in the manufacture of monochloroacetic acid, the step of: introducing chlorine into a mixture maintained at a temperature of about 25 degrees centigrade under a superatmospheric pressure of at least ten pounds per square inch, said mixture consisting of a phosphorous chloride and acetic acid, said phosphorous chloride being present in amount between about five and about twelve percent of the quantity of acetic acid present.

2. In a method for preparing an acetic acid reactant for use in the manufacture of monochloroacetic acid, the step of: introducing chlorine into a mixture maintained at a temperature below about 50 degrees centigrade and under a superatmospheric pressure of at least ten pounds per square inch, said mixture containing acetic acid and a phosphorous material selected from the group consisting of elemental phosphorous and a phosphorous compound convertible to a phosphorous chloride with chlorine, said phosphorous material being present in an amount such that there will be between about five and about twelve percent of a phosphorous chloride present in the reaction mixture, based on the quantity of acetic acid present.

3. The process of claim 2 wherein the phosphorous material employed is phosphorous trichloride.

4. In a method for the preparation of monochloroacetic acid, the steps which include: introducing chlorine into a mixture maintained at a temperature below about 50 degrees centigrade under a superatmospheric pressure of at least ten pounds per square inch, said mixture containing acetic acid and a phosphorous material selected from the group consisting of elemental phosphorous and a phosphorous compound convertible to a phosphorous chloride with chlorine, said phosphorous material being present in an amount such that there will be between about five and about twelve percent of a phosphorous chloride present in the reaction mixture, based on the quantity of acetic acid present; and, increasing the temperature of the reaction mixture to between about 85 and 130 degrees centigrade while maintaining a superatmospheric pressure of at least ten pounds per square inch thereon and continuing the introduction of chlorine.

5. In a method for the preparation of monochloroacetic acid, the steps which include: introducing chlorine into a mixture maintained at a temperature of about 25 degrees centigrade under a superatmospheric pressure of at least ten pounds per square inch, said mixture consisting of acetic acid and phosphorous chloride, said phosphorous chloride being present in an amount between about five and about twelve percent of the quantity of acetic acid present; and, increasing the temperature of the reaction mixture to above about 85 degrees centigrade and below about 130 degrees centigrade, while maintaining a superatmospheric pressure between about 10 and 100 pounds per square inch thereon, continuing the introduction of chlorine until a mole ratio of chlorine to acetic acid of approximately 1 to 2 is reached.

JOSEPH A. SONIA.
CARSON E. LISMAN.

REFERENCES CITED

The following references are of record in the file of this patent:

UNITED STATES PATENTS

| Number | Name | Date |
|---|---|---|
| 721,961 | Marckwald | Mar. 3, 1903 |
| 1,757,100 | Strosacker | May 6, 1930 |
| 2,010,685 | Bass | Aug. 6, 1935 |
| 2,503,334 | Hammond et al. | Apr. 11, 1950 |

FOREIGN PATENTS

| Number | Country | Date |
|---|---|---|
| 6,031 | Great Britain | of 1910 |
| 506,280 | Germany | Sept. 1, 1930 |
| 638,117 | Germany | Nov. 10, 1936 |

OTHER REFERENCES

Lyubarskii, Chem. Abs., vol. 24, p. 827 (1930).
Shilov. Chem. Abs., vol. 24, pp. 827–828 (1930).
Bruckner, Chem. Abs., vol. 24, p. 61 (1930).